US006813249B1

(12) United States Patent
Lauffenburger et al.

(10) Patent No.: US 6,813,249 B1
(45) Date of Patent: Nov. 2, 2004

(54) SYSTEM AND METHOD FOR PREFETCHING DATA

(75) Inventors: Kenneth A. Lauffenburger, Carrollton, TX (US); Al Whaley, Palo Alto, CA (US); Klaus S. Fosmark, Plano, TX (US); William A. Perry, Jr., Addison, TX (US); Charles F. Shelor, Arlington, TX (US)

(73) Assignee: Efficient Networks, Inc., Dallas, TX (US)

( * ) Notice: Subject to any disclaimer, the term of this patent is extended or adjusted under 35 U.S.C. 154(b) by 0 days.

(21) Appl. No.: 09/251,110

(22) Filed: Feb. 16, 1999

(51) Int. Cl.[7] .................. H04L 12/28; H04L 12/56; G01R 31/08; G06F 11/00; G08C 15/00; H04J 1/16; H04J 3/14

(52) U.S. Cl. .......................... 370/253; 370/412

(58) Field of Search ................ 370/412–418, 370/351, 389, 399.1, 419–420, 421, 428–429, 253; 710/52, 54, 56

(56) References Cited

U.S. PATENT DOCUMENTS

| 5,430,721 A | * | 7/1995 | Dumas et al. | 370/395.41 |
|---|---|---|---|---|
| 5,533,020 A | | 7/1996 | Byrn et al. | 370/395.4 |
| 5,579,312 A | | 11/1996 | Regache | 370/397 |
| 5,732,087 A | | 3/1998 | Lauer et al. | 370/416 |
| 5,751,709 A | | 5/1998 | Rathnavelu | 370/395.4 |
| 5,787,086 A | | 7/1998 | McClure et al. | 370/413 |
| 5,835,494 A | | 11/1998 | Hughes et al. | 370/397 |
| 5,844,890 A | | 12/1998 | Delp et al. | 370/230 |
| 5,870,628 A | | 2/1999 | Chen et al. | 710/22 |
| 5,968,128 A | * | 10/1999 | Lauck et al. | 709/232 |
| 5,983,279 A | * | 11/1999 | Lin et al. | 709/235 |
| 5,991,867 A | | 11/1999 | Fosmark | 712/6 |
| 6,018,527 A | | 1/2000 | Yin et al. | 370/395.41 |
| 6,028,843 A | | 2/2000 | Delp et al. | 370/235 |
| 6,041,059 A | | 3/2000 | Joffe et al. | 370/412 |
| 6,175,572 B1 | * | 1/2001 | Kim | 370/468 |
| 6,414,961 B1 | * | 7/2002 | Katayanagi | 370/389 |

* cited by examiner

Primary Examiner—Seema S. Rao
Assistant Examiner—Kevin C. Harper
(74) Attorney, Agent, or Firm—Baker Botts L.L.P.

(57) ABSTRACT

A transmission circuit for transmitting data from a host to a remote includes a plurality of memory queues, and a memory controller operable to prefetch a burst of data cells from the host, wherein a first data cell of the burst is transmitted by the memory controller to the remote and the remainder of the data cells of the burst are stored in the plurality of memory queues for later transmission to the remote.

39 Claims, 4 Drawing Sheets

SYSTEM AND METHOD FOR PREFETCHING DATA

CROSS-REFERENCE TO RELATED APPLICATIONS

This application is related to U.S. patent application Ser. No. 09/251,105 now U.S. Pat. No. 6,661,774, entitled "System and Method for Traffic Shaping Packet-Based Signals," and U.S. patent application Ser. No. 09/251,107, now U.S. Pat. No. 6,621,824, entitled "Data Transmission System and Method of Operation;" both applications filed concurrently with this application.

TECHNICAL FIELD OF THE INVENTION

The present invention relates to the field of data processing and communications, and more particularly to a system and method for prefetching data.

BACKGROUND OF THE INVENTION

Data transmission over a network using an Asynchronous Transfer Mode (ATM) protocol involves transmitting individual data cells that have an information field and a header field. The header field includes a virtual path identifier (VPI) and a virtual channel identifier (VCI) that, together, define a virtual channel connection (VCC) between two ATM endpoints. Data cells originating from the same virtual channel address (VCA) may exhibit an irregular recurrence pattern of physical transmission on a network, as cells are transmitted according to their actual demand. As a result, data cells transmitted from an ATM endpoint to a network interface are often individually transmitted. This involves transmitting overhead associated with each data cell across the bus, resulting in an inefficient data transmission. Furthermore, the interface bus allocates bandwidth over which the data cells are transmitted based upon availability, so that if the bandwidth is not used it is lost. Transmitting individual data cells fails to optimize the use of allocated bandwidth resulting in an inefficient data transmission across the interface bus.

SUMMARY OF THE INVENTION

In accordance with the present invention, a system and method for prefetching data is provided that substantially eliminates or reduces disadvantages and problems associated with previous data transmission systems.

In one embodiment of the present invention, a transmission circuit for transmitting data from a host to a remote includes a plurality of memory queues, and a memory controller operable to prefetch a burst of data cells from the host, wherein a first data cell of the burst is transmitted by the memory controller to the remote and the remainder of the data cells of the burst are stored in the plurality of memory queues for later transmission to the remote.

Technical advantages of the present invention relate to a data communication system having the ability to efficiently and economically transfer ATM data cells from an ATM endpoint to an ATM network. More particular technical advantages include a data communication system that prioritizes the transmission of ATM data cells from an ATM endpoint to an ATM network based on demand by dynamically allocating portions of memory associated with the ATM endpoint to queue data cells originating from a common and frequently recurring VCA at the ATM endpoint.

The technique of dynamically allocating memory allows the system to prefetch data cells across an interface bus associated with the ATM endpoint in a burst prior to transmission to the ATM network. The prefetched cells are stored in queues that can be transmitted directly to the network and without the need to acquire bandwidth from the interface bus, eliminating a potential source of delay in endpoint to network data communication.

Prefetching data for frequently accessed VCAs also reduces the number of individual cell transfers across the interface bus. Transmitting data cells across the interface bus in a burst rather than individually reduces the amount of transmitted overhead information and optimizes the use of allocated bandwidth for the interface bus, resulting in a faster, more efficient transmission of data cells from the ATM endpoint to the ATM network.

The selective use of memory queues for these frequent VCAs also limits the allocation of memory required to support the vast number of potential VCAs at the particular ATM endpoint. dr

BRIEF DESCRIPTION OF THE DRAWINGS

For a more complete understanding of the present invention and its advantages, reference is how made to the following description taken in conjunction with the accompanying drawings, in which like reference numbers indicate like features and wherein.

DETAILED DESCRIPTION OF THE INVENTION

Figure 1:
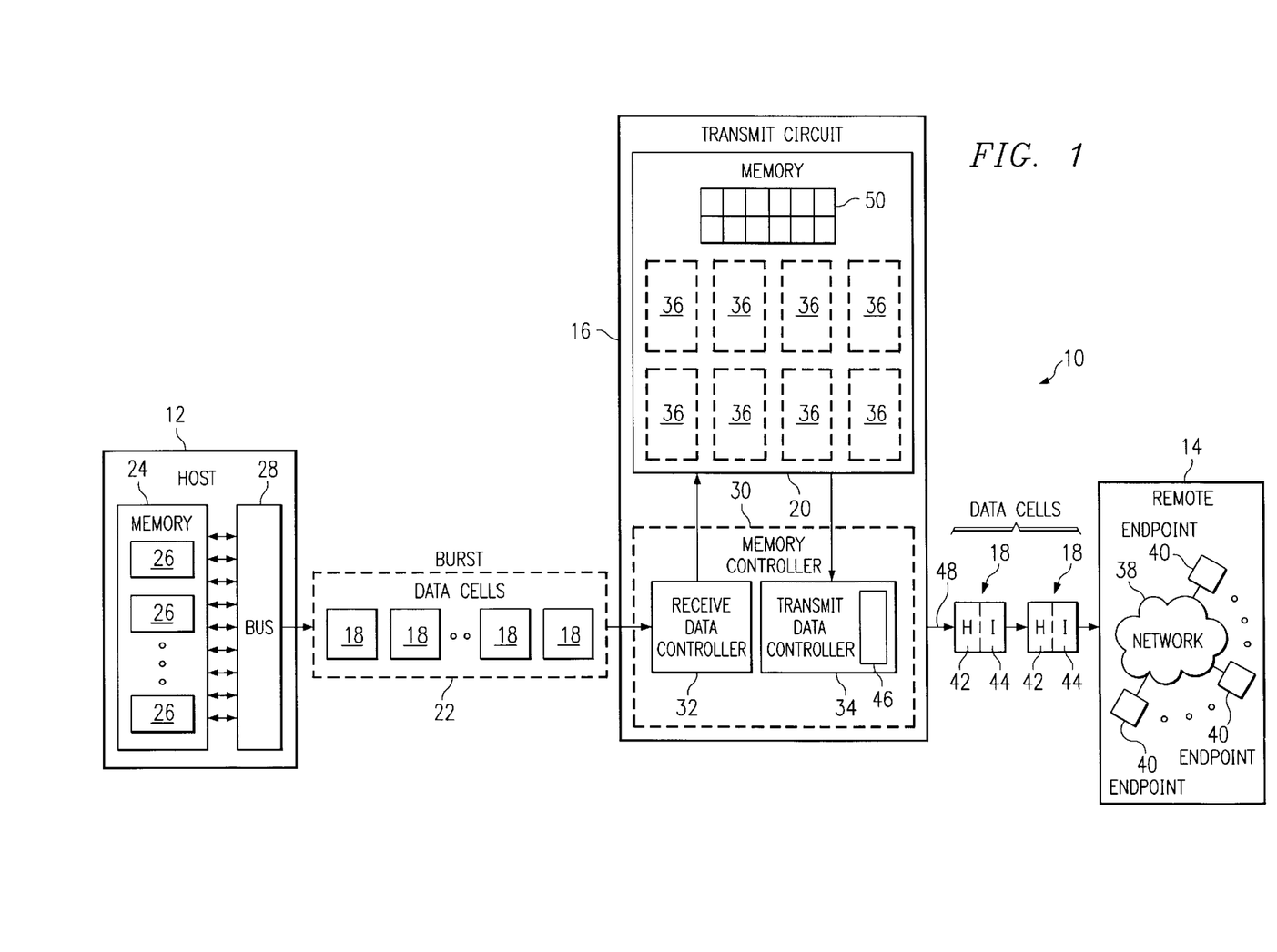
FIG. 1 illustrates a block diagram of a data transmission system in accordance with the present invention.

FIG. 1 illustrates a data communication system 10 that includes a host 12 coupled to a remote 14 by a transmit circuit 16. In general, system 10 prioritizes the transmission of data cells 18 from host 12 to remote 14 based on demand by prefetching data cells 18 sharing a common and frequently recurring address at host 12 in a burst 22 across bus 28 and storing data cells 18 in dynamically allocated portions of a memory 20 of transmit circuit 16.

Host 12 may include any suitable organization of volatile or non-volatile memory 24 and any other peripheral components associated with a computing device, such as, for example, an input device, an output device, or an interface device. Memory 24 comprises any suitable organization of data structures 26, wherein each data structure 26 is associated with a particular virtual channel. Memory 24 couples to peripheral components of host 12 using bus 28. Bus 28 may comprise a Peripheral Component Interconnect (PCI) bus, for example, or any other suitable data bus or technology that provides input/output capabilities to memory 24.

Remote 14 may comprise a network 38 supporting a number of network endpoints 40, one of which may be host 12. Network 38 comprises any combination or number of hubs, routers, bridges, gateways, switches, or any other association of suitable communication devices and related software that transmits packet-based or cell-based data between endpoints 40, such as, for example, from host 12 to endpoint 40. In one embodiment, network 38 comprises an ATM network implemented independently or in connection with a wide area network (WAN) or a local area network (LAN), such as an Ethernet network, a token ring network, or a fiber distributed data interface (FDDI) network. Network 38 supports higher level connectionless protocols such as Internet Protocol (IP), higher level connection-oriented protocols such as Frame Relay, or any other suitable networking protocol, by mapping the protocol data stream into an ATM protocol backbone or into any other suitable cell-based protocol. In this way, network 38 supports voice, data, and video signal transmissions. Endpoints 40 may comprise ATM endpoints, memory endpoints, or peripheral components.

Transmit circuit 16 comprises memory 20 coupled to a memory controller 30. Memory controller 30 in one embodiment comprises a receive data controller 32 and a transmit data controller 34 as shown. Transmit circuit 16 may comprise any combination of memory, processing components, or discrete logic, or may be integrated into a portion of or a complete computing device or application specific integrated circuit (ASIC). Memory controller 30 may be composed of multiple components, circuits, processors, or modules that may or may not all be resident at transmission circuit 16. Transmit circuit 16 utilizes memory controller 30 to access memory 20 to store data cells 18 received via burst 22 from one of data structures 26 corresponding to a frequently accessed address of host 12 prior to the transmission of data cells 18 to remote 14.

Memory 20 may comprise any suitable organization of volatile memory, such as, for example, RAM, SRAM, DRAM, or SDRAM that includes any appropriate number of files, stacks, queues, or any other suitable data structures. In one embodiment, memory 20 includes a plurality of memory queues 36 and a plurality of individual cell buffers 50. Memory queues 36 store data cells 18 that are prefetched from host 12 for future scheduling and transmission along a particular virtual channel to remote 14. Individual cell buffers 50 store data cells 18 that are currently scheduled for transmission along a virtual channel to remote 14. It should be understood that while data communication system 10 is illustrated in FIG. 1 as comprising eight memory queues 36 and ten individual cell buffers 50, a greater or lesser number of memory queues and/or cell buffers are fully contemplated and encompassed by the scope of the present invention.

In one embodiment, memory 20, receive data controller 32, and transmit data controller 34 together may comprise an application specific integrated circuit (ASIC) that provides ATM services to host 12. In another embodiment, controllers 32 and 34 may comprise an ASIC that interfaces with memory 20 that is external to the ASIC. The ASIC may be implemented on a network interface card associated with a particular host 12, or on any communication device associated with remote 14, such as, for example, a router, a bridge, a gateway, or a switch.

Each data cell 18 includes a header field 42 and an information field 44. In one embodiment, each data cell 18 comprises an ATM data cell of a fixed length, such as, for example, fifty-three bytes, of which header field 42 comprises five bytes and information field 44 comprises forty-eight bytes. Data cells 30 of a fixed length may be switched by hardware and require lower processing overhead than data cells of a variable length, resulting in a faster transmission time from host 12 to remote 14.

Header field 42 includes a two-part connection identifier used by ATM protocols to route data cells 18 between endpoints 40. In particular, header field 42 includes a virtual path identifier (VPI) representing a group of virtual circuits that define a particular transmission route between ATM switches. Header field 42 also includes a virtual channel identifier (VCI) that is used locally at an endpoint 40 to denote a unique connection within a virtual path, such as, for example, a connection between one of the plurality of data structures 26 of host 12 and a data structure of remote 14 that are both associated with a common VCA. Multiple VCAs may be supported by a single virtual path. A connection between endpoint 40 and host 12 defines a virtual channel connection (VCC).

Information field 44 includes an ATM protocol data stream generated by a higher-level protocol. In particular, field 44 includes a data stream of a higher level connectionless or connection-oriented protocol that is mapped into an ATM protocol backbone. Information field 44 may include voice, data, video signals, and/or other suitable transmissions.

For purposes of the following discussion, data cells 18 will be described as stored on host 12 in the preceding format. However, it is understood that data stored on host 12 may not be structured in the above described format, or may not even be structured in cells. In particular, host 12 may simply store an array of data consistent with the data stream described in information field 44. In such cases, during data transfer from host 12 to receive data controller 32 across bus 28 the data may be accessed forty-eight bytes at a time, for example. Receive data controller then removes the forty-eight byte data packet from bus 28 and formats the forty-eight bytes into a format compatible with ATM protocol, including creating a five byte header 42, for example, based on the VCA associated with the data.

Receive data controller 32 may comprise any suitable configuration of hardware and/or software that receives individual data cells 18 or bursts 22 from host 12. Receive data controller 32 responds to a VCC identifier generated by a transmission scheduler that indicates a plurality of data cells 18 associated with a particular virtual channel are scheduled to be transmitted from host 12 to remote 14. Receive data controller 32 then scans data fields associated with the particular virtual channel that are stored on host 12 or transmit circuit 16 to obtain an address corresponding to that virtual channel's VCA, hereafter referred to as a start address, where data for that virtual circuit is stored in host 12.

Receive data controller 32 first determines if the channel being served corresponds to a channel that has been queued in one of the plurality of memory queues 36. More specifically, controller 32 interrogates each of the eight memory queues 36 to determine if any of memory queues 36 are currently allocated to the same channel as data cell 18. A similar determination may be accomplished by comparing the channel's V.A. to a flag, register, or other indicator.

In one embodiment, transmit data controller 34 dynamically allocates channels to memory queues 36 based upon the frequency that data cells 30 from each channel are transmitted to remote 14 by transmit data controller 34. If eight memory queues 36 are utilized, for example, transmit data controller 34 allocates each of the eight channels with the most frequently transmitted data cells 18 to a corresponding memory queue 36. This process of allocation is described in detail accompanying the description of transmit data controller 34 described below.

The advantage of utilizing memory queues 36 for each of these frequently recurring channels is that multiple data cells 18 scheduled for transmission on a particular channel can be prefetched via bursts 22 during periods when bus 28 is idle and stored in one of memory queues 36. Thus, dynamically allocating memory 20 to store data cells 18 associated with the most frequently recurring channels allows system 10 to transmit these data cells 18 across bus 28 in bursts 22 rather than individually, and without requiring a significant allocation of memory 20 to support all of the potential VCAs at a particular endpoint 40. Transmitting data cells 18 across bus 28 in burst 22 rather than individually reduces the amount of transmitted overhead information by eliminating the need for multiple address assertions and reduce header information. Bursts also optimize the use of allocated bandwidth for bus 28, resulting in a faster, more efficient transmission of data cells 18 from host 12 to remote 14. In this way, system 10 services the eight most frequently recurring outgoing channels at any given time using an optimum amount of memory and a minimum period of delay.

In one embodiment, if transmit data controller 34 has assigned a memory queue 36 to a particular channel, then receive data controller 32 determines if any data cells 18 remain in memory queue 36 to be transmitted. If data cells 18 remain in memory queue 36 for transmission to remote 14, then receive data controller 32 does not access bus 28 but instead passes a linked pointer referencing the first queued data cell 18 to transmit data controller 34. Alternatively, the transmit data controller 34 may separately determine that memory queue 36 contains data cells 18 and independently create a linked pointer to the first cell 18 of memory queue 36.

If receive data controller 32 determines that an assigned memory queue 36 does exist for the channel, but that the assigned memory queue 36 is empty, receive data controller 32 will prefetch data cells 18 in a burst 22 from host 12 to transmit circuit 16. Thus, prefetching of data via burst 22 occurs when data from a particular start address is scheduled to be transmitted and memory queue 36 associated with that channel is empty.

The decision on whether or not to prefetch data cells 18, and in particular the decision to utilize system resources to transfer and store a burst 22 of data cells 18, may also depend on other variables and or conditions set by system 10. In particular, the availability of memory 20 in transmit circuit 16, the paucity of data cells 18 stored in a transmit register 46 described below, the availability of bus 28, the demands placed upon bus 28 by host 12 peripherals, or the bandwidth of bus 28 utilized by host 12 in receiving data from remote 14 may all be factors. Such factors and other performance parameters of system 10 may be capped, ranked, classified, or flagged to ensure optimal performance of system 10, and any of these factors may result in a decision by receive data controller 32 not to prefetch a burst 22 of data cells 18 and to instead simply transfer an individual data cell 18 from host 12 to transmit circuit 16. If receive data controller 32 determines that no memory queue 36 is associated with the channel, then receive data controller 32 proceeds with transfer of an individual data cell 18 across bus 28.

After a start address is acquired, receive data controller 32 initiates the process for transferring individual data cells 18 or bursts 22 of data cells 18 from host 12. Receive data controller 32 first arbitrates for and acquires bandwidth on bus 28. In one embodiment, receive data controller 32 acquires bandwidth by communicating interrupts or other indications to an arbiter resident in host 12. This process of bus acquisition may comprise a series of signals between receive data controller 32 and host 12, including a request signal sent by receive data controller 32 requesting available bandwidth on bus 28, and a grant signal issued by host 12 granting control of bus 28. Upon being granted control of bus 28, receive data controller 32 waits until bus 28 has reached an idle state. Bus 28 is idle when it is not currently transmitting data associated with other components of host 12. When bus 28 is idle, receive data controller 32 initiates the process of receiving data utilizing the finite amount of bandwidth granted by host 12 to receive data controller 32.

Generally, to initiate data reception, receive data controller 32 asserts the start address on bus 28 followed by host 12 sending data cells across bus 28 to transmission circuit 16 either individually or in bursts. In one embodiment, receive data controller 32 initiates data reception following bus acquisition by asserting an initiation indicator and simultaneously asserting the start address, corresponding to a data structure 26 in memory 24 of host 12.

Receive data controller 32 must manage the bus transaction, according to the specific type of bus 28 and bus settings utilized, in order to cause a burst of data words to be transferred which comprises one or an integral number of data cells. This may or may not require receive data controller 32 to employ different bus transaction types according to burst size to optimize cache performance, and it may be necessary to suspend and resume the transaction if it is preempted by another bus master.

Transferring multiple data cells in a single burst 22 rather than individual data cells significantly reduces overhead normally associated with data transfers, and can increase overall performance on bus 28. For example each transaction on bus 28 may include the following overheads: bus acquisition, which may require several clock cycles; assertion of transaction type and start address, which require one clock; a clock cycle for bus turn-around; and usually one to several clocks of slave wait cycles for cache prefetch. For example if ten cells are transferred in a single burst instead of ten separate bursts, then this overhead is incurred only once instead of ten times, thereby using less bus bandwidth and allowing it to be put to more productive use.

Receive data controller 32 controls the maximum size of burst 22 by determining the maximum number of data cells 18 that may be transmitted across bus 28 in any particular burst 22. By controlling the size of burst 22, receive data controller 32 avoids impeding the performance of other components of host 12 that may be competing for bandwidth on bus 28 while still optimizing the use of the available bandwidth on bus 28. Other relevant factors affecting the length of burst 22 include, but are not limited to, the size of memory queues 36 and the amount of bus 28 bandwidth necessary to ensure adequate host 12 reception of data from remote 14.

Upon receiving data cells 18 from host 12 via bus 28, receive data controller 32 stores data cells 18 in memory 20. More specifically, if receive data controller 32 receives an individual data cell 18, receive data controller 32 places data cell 18 in one of individual cell buffers 50 for direct transmission by transmit data controller 34. If receive data controller 32 receives burst 22 of data cells 18, the first data cell 18 of burst 22 is likewise transferred directly to transmit data controller 34 via an intermediate cell buffer. In both cases after accessing bus 28 to obtain data at least one data cell 18 will be stored in one of individual cell buffers 50 for immediate transmission. Any remaining data cells 18 of burst 22 are queued in one of memory queues 36 corresponding to the channel associated with the data cells 18, referred to above as prefetching.

Transmit data controller 34 may comprise any suitable configuration of hardware and/or software that transmits data cells 18 to remote 14. Transmit data controller 34 includes transmit register 46. Transmit data controller 34 retrieves data cells 18, or their linked pointers, from one of individual cell buffers 50 or, if a particular data cell 18 was prefetched, from an assigned memory queue 36. Transmit data controller 34 stores the retrieved data cells 18 in transmit register 46. Data cells 18 are stored in linked order until each data cell 18 is transmitted in a designated time slot. Thus, transmit data controller 34 releases data cells 18 from transmit register 46 on a first in first out (FIFO) basis for transmission to remote 14. The transmission of each data cell 18 is carried out during a designated transmission time slot along a virtual channel on transmission medium 48.

As data is scheduled to be transmitted on a particular channel, transmit data controller 34 first checks to see if a particular memory queue 36 has been allocated to that channel. For channels that are allocated to a particular memory 36, transmit data controller 34 determines if memory queue 36 contains any data cells 18 that have been prefetched. If memory queue 36 does contain prefetched data cells 18, transmit data controller 34 retrieves a link pointer to the next data cell 18 within memory queue 36 and places the pointer in a transmit register 46 that is resident within transmit data controller 34.

Alternatively, transmit data controller 34 may rely on receive data controller 32 to determine the queue assignment and status for a particular channel. In this alternate embodiment, receive data controller 32 either passes an indicator identifying a specific memory queue 36 for a channel that is scheduled for transmission and an acknowledgment that data cells 18 remain in memory queue 36 or passes a link pointer to the location of the next data cell 18 in memory queue 36. In any case, transmit data controller 34 either obtains a link pointer to a queued data cell 18 directly or obtains the link pointer from receive data controller 32.

For channels that are not allocated to a specific memory queue 36, or if the memory queue 36 associated with the channel is empty of data cells, transmit data controller 34 first awaits the completion of the direct retrieval of data cell 18 from a start address of host 12 by receive data controller 32. A channel assigned to an empty memory queue 36 will result in the transfer of a burst 22 across bus 28 from host 12 that then refills memory queue 36. A channel not assigned to one of memory queues 36 will result in the transfer of a single data cell 18 across bus 28 from host 12. However, in either case receive data controller 32 will store the single data cell 18 or the first data cell of burst 22 in one of individual cell buffers 50.

After receive data controller 32 directly retrieves data cell 18 from host 12 and places data cell 18 in one of individual cell buffers 50, transmit data controller 34 retrieves a link pointer corresponding to data cell 18 stored in individual cell buffer 50. The linked pointer, as previously mentioned, is then stored in transmit register 46 and later used to transmit the contents of one of cell buffers 50 in a predesignated time slot along a virtual channel on transmission medium 48.

Transmit data controller 34 also allocates the assignment of memory queues 36 to channels based on the interval of time that elapses between data cells 18 transmitted on a particular channel. In one embodiment, this interval of time is measured in terms of the number of transmission time slots that elapse between the transmission of data on a particular channel. Transmission time slot designate windows of time during which a single data cell 18 is transmitted along transmission medium 48. The number of elapsed time slots between the transmission of single data cells 18 on a particular channel is referred to as an inter-cell gap.

The measure of an inter-cell gap, or other measure of time elapsed or cells transmitted between transmissions on a particular channel can be accomplished by transmit data controller 34 or the scheduler previously mentioned. In one embodiment, each time a data cell 18 is transmitted on a particular channel, transmit data controller 34 determines the current inter-cell gap between the transmission of the current data cell 18 on a channel and the transmission of the last data cell 18 on that channel. One means of determining the inter-cell gap is by comparing the current value of a queue (FIFO) pointer of transmit register 46 to the value of that queue pointer at the time of the last transmission of one of data cells 18 on that channel. Other means of determining frequency of transmission may be utilized including, but not limited to, employing a clock signal, utilizing an interrupt driven incremental counter, or comparing sequential pointer values.

In one embodiment, once a frequency of transmission or inter-cell gap for a channel is established relative to the last cell transmitted, represented as an integer value for example, the frequency or gap can be compared to a queue threshold to determine if the channel is eligible for prefetch via one of memory queues 36.

For example, a queue threshold might be set to an inter-cell gap of sixty time slots. In such an example, if data cells are transmitted along a particular channel every fifty time slots, the channel would be eligible for prefetch in one of memory queues 36 and would be assigned to a specific memory queue 36. However, if all of memory queues 36 are already assigned to a channel and no memory queues 36 are available for prefetch, the queue threshold is reset equal to the inter-cell gap of the channel. In this example, the new queue threshold value would be changed from sixty to fifty time slots.

Alternatively, the new queue threshold may be reset to a new value offset a certain number of time slots from the previous queue threshold. In one embodiment transmit data controller 34 keeps track of the latest inter-cell gap for each channel currently assigned to one of memory queues 36. In such an embodiment the new queue threshold may be reset to the inter-cell gap of any of the currently assigned channels, the median inter-cell gap, or any other suitable value of an inter-cell gap that provides for the allocation of memory queues 36 to the most frequently serviced channels.

Any channels associated with existing memory queues 36 that do not meet the new queue threshold are no longer eligible for prefetch. Thus, any memory queue 36 currently allocated to a channel not compliant with the new queue threshold would gradually release the data cells 18 linked within to transmit register 46 for transmission and eventually become unallocated for potential use with a more frequently serviced channel.

In some circumstances all of memory queues 36 may not be allocated. For example, upon reset of the queue threshold, possibly upon the initialization of system 10 for use with a newly connected network, or when the inter-cell gap for an allocated channel drops significantly, all of memory queues 36 will not be allocated. For example, when the queue threshold is reset on a system 10 utilizing eight queues 36 it is possible that only four of the channels currently allocated to memory queues 36 will meet the newly imposed queue threshold. The remainder of the channels would no longer occupy memory queues 36 leaving four memory queues 36 unallocated.

Thereafter, as channels are tested for prefetching eligibility upon each data cell 18 being transmitted from transmit register 46, each unsuccessful test of a channel while there are any unallocated queues 36 will result in the queue threshold value being increased by one. At equilibrium, the occasional resetting of the queue threshold and the incremental increase of the queue threshold caused by the existence of empty memory queues 36 will result in a prefetch mechanism that consistently queues data cells 18 of the channels most frequently transmitted upon.

Figures 2, 4:
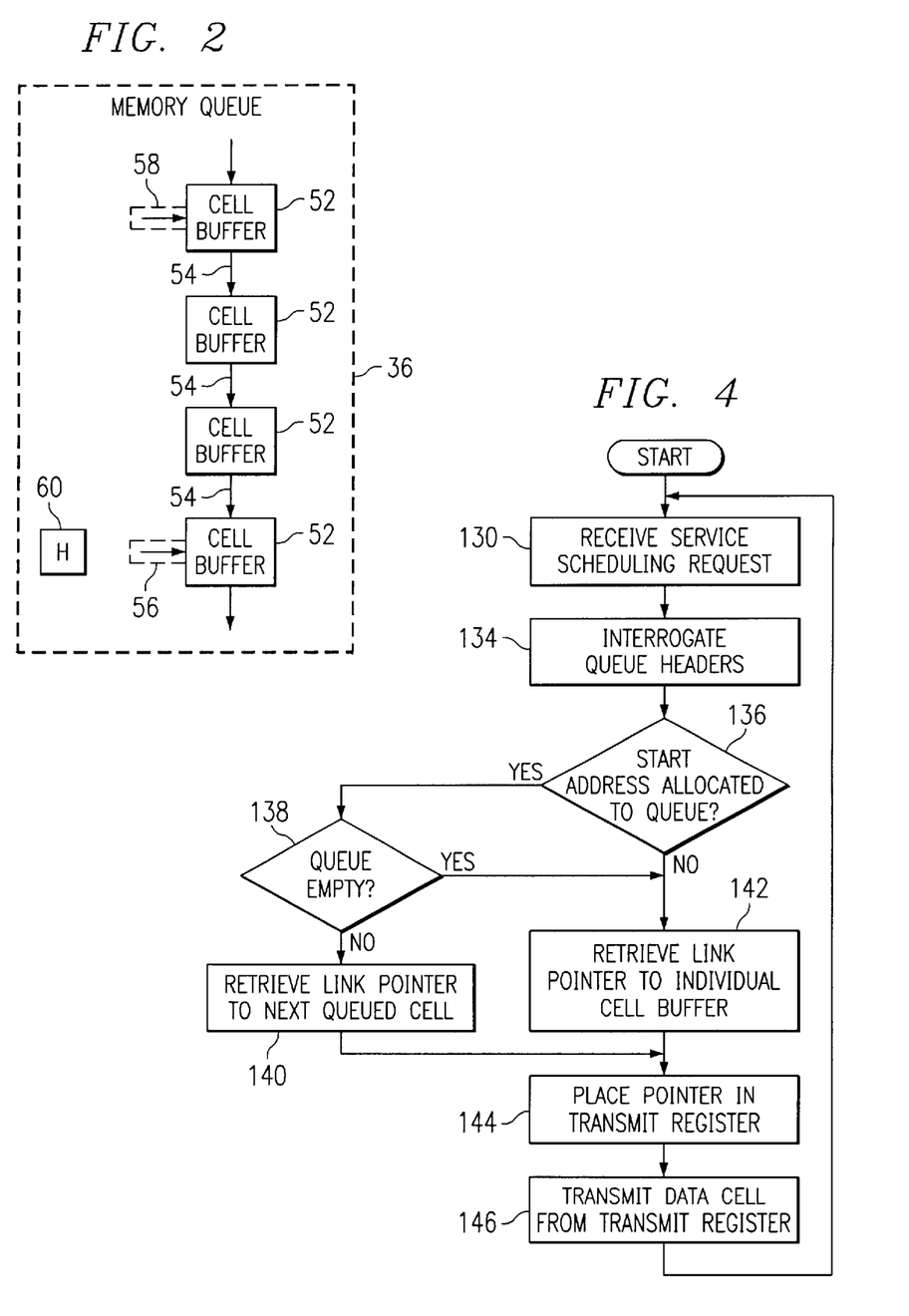
FIG. 2 illustrates one embodiment of a memory queue of the system.
FIG. 4 illustrates a flow chart of a method for transmitting data from an endpoint to a network in accordance with the present invention.

FIG. 2 illustrates one embodiment of memory queue 36 of system 10. Memory queue 36 comprises a series of linked cell buffers 52. Each cell buffer 52 may comprise a sixty-four-byte allocation of memory 20 of which sixteen bits is reserved for a link pointer 54 that links individual cell buffers 52 to form memory queues 36. Memory queue 36 also includes a head pointer 56 and a tail pointer 58. Pointers 56 and 58 identify an allocation of memory 20 that contains specific data cells 18 within memory queue 36. In particular, head pointer 56 identifies the next data cell 18 to be removed from memory queue 36, and tail pointer 58 identifies the last data cell 30 received by memory queue 36.

Each memory queue 36 includes an allocation of content addressable memory reserved for an allocation header 60. Header 60 indicates the occupancy of memory queue 36 by data cells 18, and any affiliation of memory queue 36 with a particular VCA. In particular, if data cells 18 occupy memory queue 36, header 60 stores the VCA associated with those data cells 18. If memory queue 36 is unoccupied, header 60 stores a logic "0", a flag, or any other suitable indication that header 60 is unallocated.

Prior or simultaneous to placing a start address on bus 28 for the initiation of data transfer by host 12, receive data controller 32 interrogates allocation header 60 of each memory queue 36 to determine if the channel of a particular memory queue 36 matches the channel for which data is about to be fetched. If the data channel matches a channel stored in allocation header of any memory queue 36, data stored at the start address will be transferred in a burst 22 by host 12 across bus 28 and placed in cell buffers 52 associated with the particular matching memory queue 36, provided system 10 has not indicated that system resources prevent the prefetching of data because of inadequate bandwidth on bus 28, inadequate memory 20 in transmit circuit 20, or other condition as previously described relative to the structure of receive data controller 32.

Figure 3:
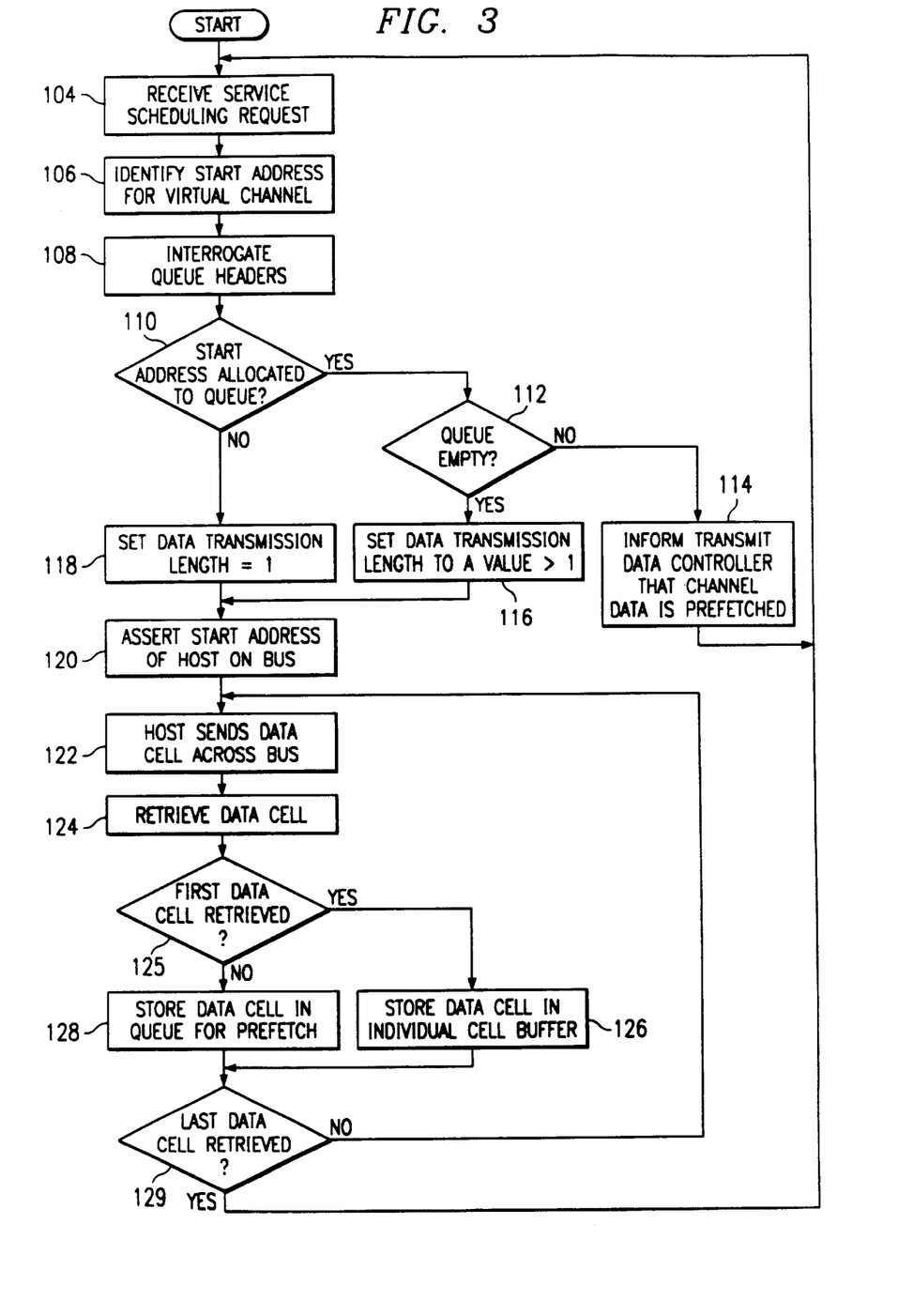
FIG. 3 illustrates a flow chart of a method for prefetching data across an interface bus in accordance with the present invention.
Figure 5:
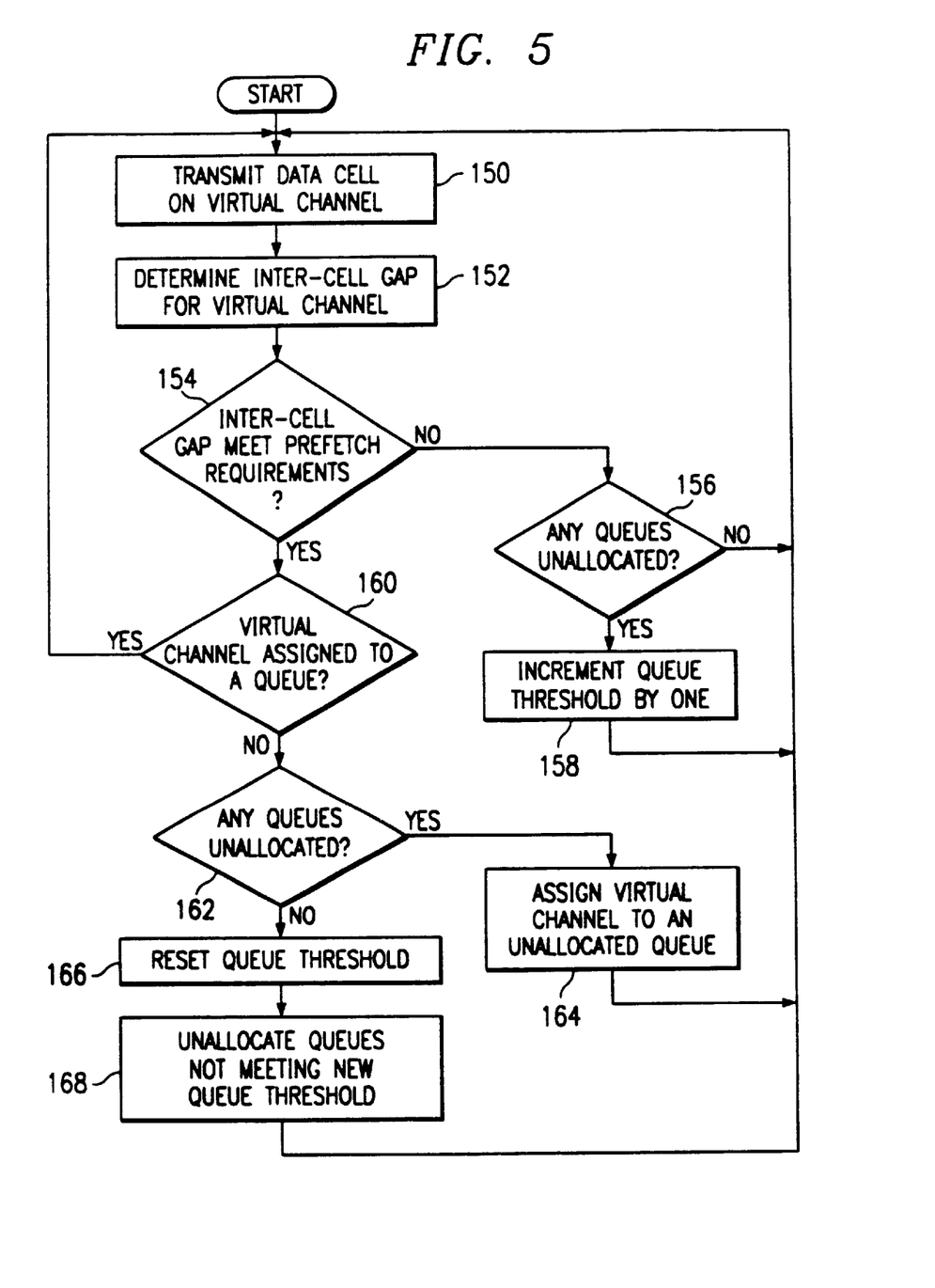
FIG. 5 illustrates a flow chart of a method for allocating memory queues to virtual channels based on the teachings of the present invention.

FIGS. 3–5 illustrate processes utilized by system 10 associated with the prefetching and transmission of data cells 18 that may or may not operate in parallel or simultaneously. Turning now to FIG. 3, a flow chart of a method for prefetching data across an interface bus is illustrated in accordance with the present invention. Receive data controller 32 first receives a service scheduling request for a particular virtual channel in step 104. Receive data controller 32 interrogates allocation header 60 of each memory queue 36 at step 108 and determines whether the requested virtual channel is associated with any of memory queues 36 at step 110. If the virtual channel is associated with a particular memory queue 36, receive data controller 32 examines the particular memory queue 36 and determines if the particular memory queue 36 is empty at step 112. If the particular memory queue 36 is not empty, receive data controller 32 informs transmit data controller 34 that data associated with the scheduled virtual channel is prefetched in memory queue 36 in step 114 and then receive data controller 32 returns to step 106. Thus, when data is prefetched in a particular memory queue 36, a significant amount of system 10 resources are conserved as receive data controller 32 does not need to access bus 28 and transfer data cells 18 as described in steps 116–128.

If the particular memory queue 36 is empty in step 112, execution proceeds to step 116 where a data transfer length is set to the allocated size of memory queues 36 or shorter length depending on the status and availability of system 10 resources. This length should usually be greater than one cell to accomplish any degree of prefetching, as the first data cell 18 will usually be stored in one of individual cell buffers 50 for immediate transmission. If the start address is not associated with a memory queue 36 in step 110, execution proceeds to step 118 where receive data controller 32 sets the data transmission length equal to one data cell 18. In either case, the data transfer length should be an integral number of cell lengths. In this way, both the prefetching of data cells 18 and the transfer of an individual data cell 18 for immediate transmission can be accomplished utilizing a similar procedure flow.

In step 120, receive data controller 32 initiates data transfer by first acquiring use of bus 28 through the bus request protocol. When host 12 grants use of bus 28, receive data controller 32 asserts the start address on bus 28 in step 121. The start address specifies a memory address of data structures 26 from which host 12 should access data for transfer on bus 28 to transmit circuit 16. Host 12 then sends data cell 18 from the start address across bus 28 in step 122. Receive data controller 32 retrieves data cell 18 from bus 28 in step 124.

If data cell 18 is the first data cell 18 transmitted across bus 28, as determined in step 125, receive data controller 32 places the data cell 18 in one of individual cell buffers 50 for immediate transmission by transmit data controller 34 in step 126. The first data cell 18, even if transmitted as part of a burst 22, may be stored in one of individual cell buffers 50. Otherwise, or if data cell 18 is not the first data cell 18 retrieved by receive data controller 32, data cell 18 is placed sequentially in a linked list within the particular memory queue 36 associated with the start address or virtual channel in step 128. Step 128 therefore stores prefetched data cells 18 for a particular virtual channel in an associated memory queue 36.

Host 12 continues repeating steps 122 to 129 until receive data controller 32 indicates the data transfer is complete and that the last data cell 18 is currently being accessed in step 129. Receive data controller 32 then returns to step 104. If data cell 18 is not transmitted as part of a burst 22, then data cell 18 will be the first and last data cell 18 transmitted and steps 122 to 129 will not be repeated.

In FIG. 4 a flow chart of a method for transmitting data from an endpoint to a network is illustrated in accordance with the present invention. Transmit data controller 34 first receives a service scheduling request from the scheduler in step 130 identifying a virtual channel requiring transmission service. Transmit data controller 34 then interrogates allocation header 60 of each memory queue 36 to see if a particular memory queue 36 has been associated with that virtual channel in step 134. If one of memory queues 36 is associated with the start address as determined in step 136, transmit data controller 34 determines if the particular memory queue 36 contains any prefetched data cells 18 in step 138. Steps 130 through 138 can be accomplished by receive data controller 32 as described in the discussion of FIG. 3 with receive data controller 32 communicating the results to transmit data controller 34.

If transmit data controller 34 determines that memory queue 36 does contain data cells 18 in step 138, transmit data controller 34 retrieves a link pointer to the next data cell 18 within memory queue 36 in step 140. If memory queue 36 does not contain cells or if no memory queues 36 have been associated with the requested channel, both conditions indicating that no prefetched data cells 18 are stored in transmit circuit 16, transmit data controller 34 obtains a link pointer in step 142 pointing to one of individual cell buffers 50 where the specific data cell 18 corresponding to the start address is placed in step 126 of FIG. 3. In either case, transmit data controller 34 places the pointer retrieved in step 140 or 142 in transmit register 46 in step 144. Transmit data controller 34 eventually transmits data cell 18 from transmit register 46 on a first in first out basis in an open time slot along transmission medium 48 in step 146. Transmit data controller 34 then returns to step 130 to process the next service scheduling request.

FIG. 5 illustrates a flowchart of one embodiment of a method for allocating memory queues 36 to frequently recurring channels upon transmission. In step 150, transmit data controller 34 transmits a data cell 18 on a particular virtual channel using transmission medium 48. Transmit data controller 34 then determines an inter-cell gap based upon the number of elapsed time slots since a transmission was last made on that particular virtual channel in step 152. In step 154 the inter-cell gap is compared to a queue threshold to determine if the virtual channel meets the requirements for prefetch.

If the queue threshold is not met, transmit data controller 34 determines in step 156 if there are any memory queues 36 that transmit data controller 34 has not associated with a virtual channel. If any memory queues 36 remain unassociated, the threshold will be increased by one in step 158 thereby expanding the range of channels that would qualify for prefetch in step 154.

If the inter-cell gap falls within the queue threshold and the prefetch requirements are therefore met, transmit data controller 34 determines if the virtual channel is already assigned to a specific memory queue 36 in step 160. If the virtual channel is assigned to a memory queue 36, the allocation of memory queues 36 does not change and control returns to step 150. If the queue threshold is met but the virtual channel has not been previously assigned to a memory queue 36 for prefetch, transmit data controller 34 determines if any memory queues 36 remain unassociated in step 162. If there are memory queues 36 that are not associated with the virtual channel and are empty of prefetched cells, transmit data controller 34 assigns an empty memory queue 36 to the current virtual channel in step 164.

If all memory queues 36 are associated with a virtual channel, transmit data controller 34 resets the queue threshold equal to the inter-cell gap of the virtual channel in step 166. Alternatively, the queue threshold can be reset equal to some other value below the previous queue threshold that is based on the inter-cell gaps of channels already assigned to memory queues 36. Any channels assigned to memory queues 36 not meeting this new queue threshold will be unallocated for prefetch in step 168. Unallocated memory queues 36 retain prefetched data cells 18 until data cells 18 are transmitted to remote 14. Memory queues 36 that are unallocated for prefetch, once emptied of currently held data cells 18, will be ready for new allocation to any virtual channels that meet the new threshold requirement in step 164 of any future queue allocation process.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for prefetching a plurality of data cells from a host for later transmission to a remote using a virtual channel, comprising:
   a plurality of memory queues, each memory queue operable to store a plurality of data cells; and
   a memory controller coupled to the memory queues and a host, the memory controller being operable to assign an address associated with a virtual channel to a select one of the memory queues based at least in part on comparing a threshold value and a measured interval at which data cells associated with the virtual channel are transmitted to a remote, the memory controller being further operable to prefetch data cells from the host that are associated with the assigned address, the prefetched data cells being stored in the select one of the memory queues for later transmission to the remote using the virtual channel.

2. The system of claim 1, wherein the threshold value is based at least in part on an inter-cell gap of the data cells.

3. The system of claim 1, wherein the memory controller is operable to assign the address to the select one of the memory queues in response to comparing an inter-cell gap of the virtual channel to a queue threshold.

4. The system of claim 1, wherein the memory controller is operable to assign the address to the select one of the memory queues if an inter-cell gap of the virtual channel is less than a queue threshold.

5. The system of claim 1, wherein the memory controller is operable to modify the threshold value if an inter-cell gap of the virtual channel is less than the threshold value and all of the memory queues have previously been assigned.

6. The system of claim 1, wherein the memory controller sets the threshold value equal to an inter-cell gap of the virtual channel if the inter-cell gap of the virtual channel is less than the threshold value and all of the memory queues have previously been assigned.

7. The system of claim 1, wherein the measured interval comprises the difference between a current value of a queue pointer of the memory controller and a last transmitted value of the queue pointer of the memory controller.

8. The system of claim 1, wherein the threshold value a is modified each time an inter-cell gap of the virtual channel exceeds the threshold value and one of the plurality of memory queues remains unassigned.

9. A transmission circuit for transmitting data from a host to a remote comprising:
   a plurality of memory queues; and
   a memory controller operable to prefetch a burst of data cells from the host, wherein a first data cell of the burst is transmitted to the remote and the remainder of the data cells of the burst are stored in one of the plurality of memory queues for later transmission to the remote;
   wherein the memory controller is operable to associate each of the plurality of memory queues with a different virtual channel based at least in part on comparing a threshold value and a measured transmission rate associated with that virtual channel.

10. The transmission circuit of claim 9, wherein the burst of data cells comprises one or more data cells containing fixed lengths of data.

11. The transmission circuit of claim 9, wherein the burst of data cells comprises data cells to be transmitted on a common virtual channel.

12. The transmission circuit of claim 9, wherein the memory controller retrieves the burst of data cells in response to an asserted virtual channel identifier.

13. The transmission circuit of claim 9, wherein the memory queues are each associated with a particular virtual channel.

14. The transmission circuit of claim 9, wherein the memory controller retrieves a single data cell from one of the memory queues for transmission to the remote in response to an asserted virtual channel identifier.

15. The transmission circuit of claim 9, wherein the threshold value is based at least in part on an inter-cell gap of the data cells.

16. A method for prefetching data for transmission on a virtual channel from a host to a remote comprising:
   receiving a service request for the virtual channel;
   determining if one of a plurality of memory queues is associated with the virtual channel, wherein association of a memory queue to a virtual channel is based at least in part on comparing a threshold value and a measured transmission rate associated with the virtual channel;
   determining if the memory queue is empty of data cells in response to determining that the memory queue was associated with the virtual channel;
   prefetching data cells from the host across an interface in response to determining that the memory queue was empty; and
   storing at least some of the prefetched data cells in the memory queue for later transmission on the virtual channel.

17. The method of claim 15, wherein determining if a memory queue is associated with the virtual channel comprises interrogating a header of the memory queue.

18. The method of claim 16, wherein determining if the memory queue is empty comprises comparing a head pointer to a tail pointer.

19. The method of claim 16, wherein prefetching data cells comprises:
   asserting an address associated with the virtual channel across the interface to the host; and
   receiving data cells from the host in response to the address.

20. The method of claim 16, wherein storing the prefetched data cells comprises storing the data cells in linked order.

21. The method of claim 16, further comprising transmitting one of the prefetched data cells each time a transmission time slot that is designated for the virtual channel is available.

22. The method of claim 16, wherein the threshold value is based at least in part on an inter-cell gap of the data cells.

23. A system for transmitting a plurality of data cells from a host to a remote comprising:
   a plurality of memory queues, each memory queue being operable to store a plurality of data cells, wherein each data cell of a particular memory queue is associated with a common virtual channel;

a data bus coupled to the host and to the memory queues;

a transmit data controller coupled to the plurality of memory queues, the transmit data controller being operable to assign a virtual channel to at least one of the memory queues based at least in part on comparing a threshold value and a measured interval at which data cells associated with the virtual channel are transmitted to a remote; and a receive data controller coupled to the plurality of memory queues and to the data bus, the receive data controller being operable to transfer a burst of data cells across the data bus from an address of the host associated with a specific virtual channel address and store at least a portion of the burst of data cells in the memory queue that is assigned to the specific virtual channel.

24. The system of claim 23, wherein the receive data controller is operable to place the first data cell of the burst transferred across the data bus in an individual cell buffer and is further operable to store the remainder of data cells transferred in the burst into the assigned memory queue.

25. The system of claim 23, wherein the receive data controller is operable to transfer the burst of data cells from a particular virtual channel address in response to a virtual channel identifier.

26. The system of claim 24, wherein the receive data controller is operable to determine if data for a virtual channel that is scheduled for transmission to the remote on a particular virtual channel is stored in one of the memory queues or is stored in the individual cell buffer.

27. The system of claim 23, wherein the transmit data controller is operable to assign a virtual channel to a memory queue in response to comparing an inter-cell gap to the threshold value.

28. The system of claim 23, wherein the transmit data controller is operable to assign a virtual channel to an unassigned memory queue if an interval at which data cells associated with the virtual channel are transmitted to the remote is less than a threshold value.

29. The system of claim 23, wherein the transmit data controller modifies the threshold value if an interval of data cell transmission on a particular virtual channel is less than the threshold value and all memory queues have previously been assigned.

30. The system of claim 23, wherein the transmit data controller sets the threshold value equal to an interval of data cell transmission on a particular virtual channel if the interval for the particular virtual channel address is less than the threshold value and all memory queues have previously been assigned.

31. The system of claim 23, wherein the interval comprises the difference between a current value of a queue pointer of the transmit data controller and a last transmitted value of the queue pointer of the transmit data controller.

32. The system of claim 23, wherein the threshold value is modified each time an interval of data cell transmission on a virtual channel exceeds the threshold value and one of the memory queue remains unassigned.

33. The system of claim 23, wherein the threshold value is based at least in part on an inter-cell gap of the data cells.

34. A method for preparing data for transmission on a virtual channel from a host to a remote comprising:

at a memory controller coupled to a host through an interface, selecting a virtual channel for association with one of a plurality of memory locations, the selection based at least in part on comparing a threshold value and a measured transmission rate associated with the selected virtual channel;

associating the selected virtual channel with the one of the plurality of memory locations;

receiving a service request for the virtual channel;

identifying the memory location associated with the virtual channel; and initiating a transfer of a burst of data cells over the interface from the host to the one of the plurality of memory locations associated with the virtual channel.

35. The method of claim 34, further comprising storing either the single data cell or a first data cell of the burst in an individual cell buffer of the transmit circuit for scheduled transmission on the virtual channel to the remote.

36. The method of claim 34, further comprising storing any remaining data cells of the burst in the memory queue as prefetched data cells for later transmission on the virtual channel.

37. The method of claim 36, further comprising:

retrieving one of the prefetched data cells the next time a scheduling request is received for the virtual channel; and transmitting the data cell on the virtual channel to the remote.

38. The method of claim 34, wherein the step of initiating a burst further comprises:

asserting a start address on the bus to the host; and sending data cells sequentially from the host to the bus until the transmit circuit indicates the last data cell is being sent.

39. The method of claim 34, wherein the threshold value is based at least in part on an inter-cell gap of the data cells.

* * * * *